United States Patent [19]

Bontenbal

[11] Patent Number: 4,877,356
[45] Date of Patent: Oct. 31, 1989

[54] METHOD AND APPARATUS FOR INSTALLING A FLOWLINE NEAR THE WATERBOTTOM

[75] Inventor: Pieter J. Bontenbal, Rijswijk, Netherlands

[73] Assignee: Shell Oil Company, Houston, Tex.

[21] Appl. No.: 338,555

[22] Filed: Apr. 17, 1989

Related U.S. Application Data

[63] Continuation of Ser. No. 245,606, Sep. 19, 1988, abandoned.

[30] Foreign Application Priority Data

Sep. 30, 1987 [GB] United Kingdom ............... 8722969

[51] Int. Cl.⁴ ..................... E21B 43/01; F16L 1/04
[52] U.S. Cl. .................................. 405/169; 166/341
[58] Field of Search ............... 405/169, 170, 195; 166/338, 341, 344, 345, 347

[56] References Cited

U.S. PATENT DOCUMENTS

| | | | |
|---|---|---|---|
| 4,102,146 | 7/1978 | Dietrich | 405/169 |
| 4,277,202 | 7/1981 | Archambaud et al. | 405/169 |
| 4,676,696 | 6/1987 | Laursen | 405/169 |

Primary Examiner—David H. Corbin

[57] ABSTRACT

A method and apparatus for stabbing a flowline into a guide tube near the waterbottom and subsequently hinging over the flowline to a horizontal position. The connection operation is facilitated by a vertically oriented guide tube having along the inner wall thereof a pair of parallel slots which provide at the lower ends thereof pivot supports on which a pair of pivots which are mounted near the lower end of the flowline land during the stab in procedure. Deflectors are provided for deflecting a lower portion of the flowline while the pivots are lowered through the slots so as to induce the flowline to obtain a curved shape into a predetermined direction before the pivots land onto the pivot supports.

9 Claims, 2 Drawing Sheets

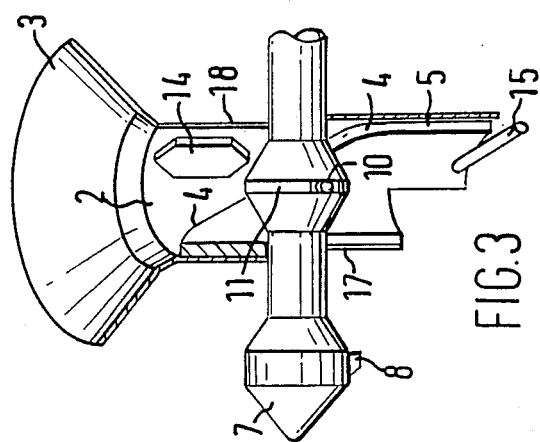
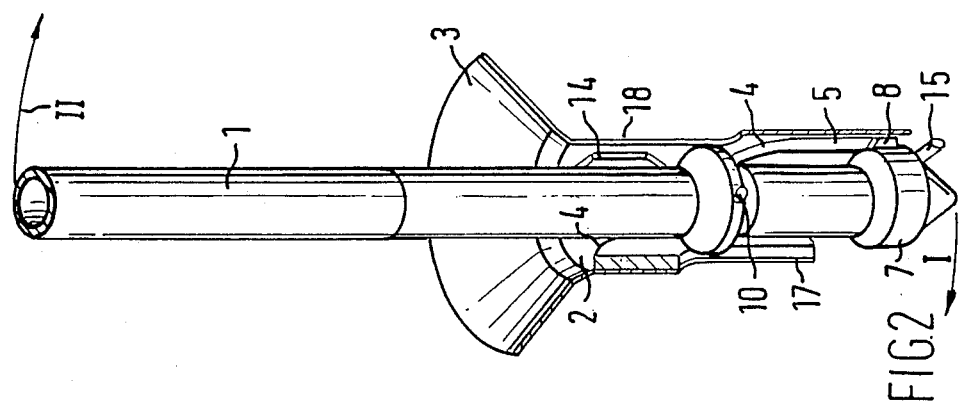
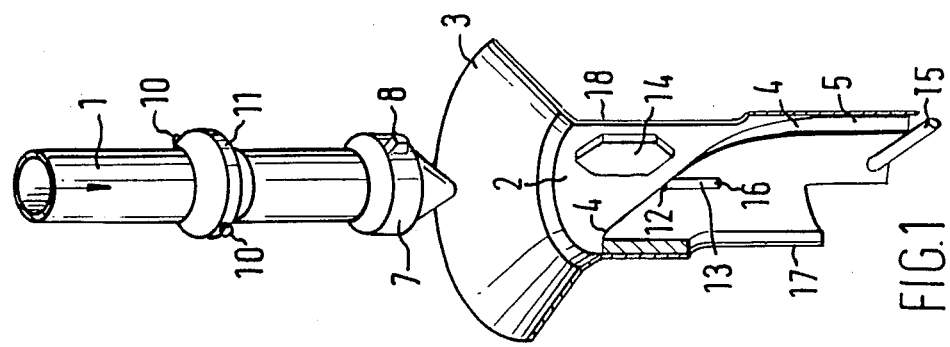

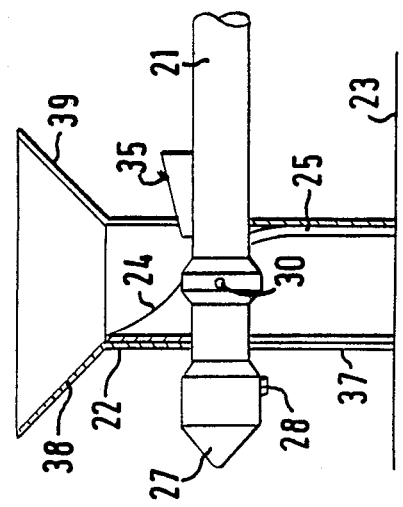
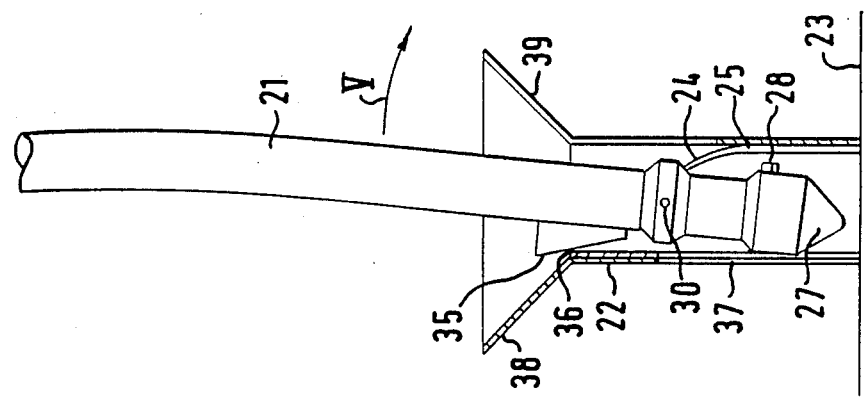
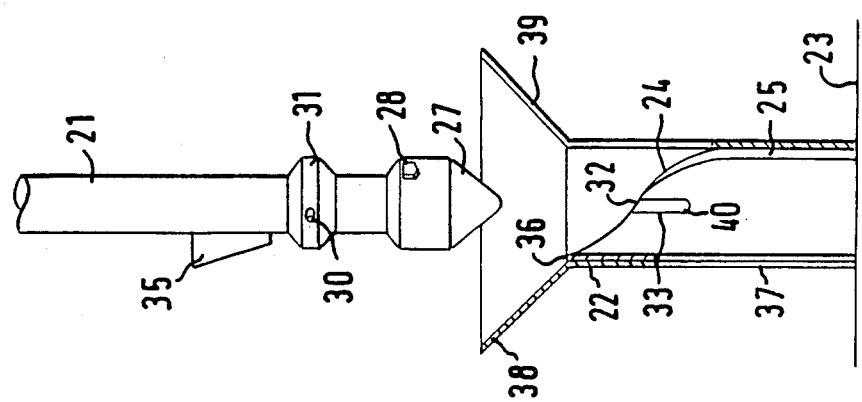

METHOD AND APPARATUS FOR INSTALLING A FLOWLINE NEAR THE WATERBOTTOM

This is a continuation of application Ser. No. 245,606, filed Sept. 19, 1988, now abandoned.

BACKGROUND OF THE INVENTION

The invention relates to a method and apparatus for installing a flowline near the waterbottom. More particularly it relates to a method and apparatus for lowering a flowline through a body of water and subsequently hinging over the flowline to a substantially horizontal position near the waterbottom.

Connecting a pipeline or flowline bundle to a subsea production facility can be a difficult and time consuming procedure, particularly in deep water. This is not difficult to understand once it is appreciated that the pipeline may be several hundred meters below the pipelay vessel, relatively immobile and difficult to remotely manipulate. A method for approaching this problem is the so-called flowline stab-in and hinge over technique disclosed in U.S. Pat. No. 4,676,696.

In accordance with this known technique a flowline is stabbed vertically into a guide tube which is mounted near the waterbottom, until a pair of pivots mounted near the lower end of the flowline land onto a pair of pivot supports which are located at the lower ends of a pair of vertical slots formed on the inner side of the guide tube. After the pivots have landed onto said supports, lowering of the flowline is continued while the pipelay vessel moves away from above the guide tube, thereby hinging over the flowline to a horizontal position and laying the flowline away from the guide tube.

A drawback of the known technique is that a heaving motion of the pipelay vessel may cause a rough landing of the pivots onto the pivot supports which may lead to buckling of the flowline which is suddenly stopped at its lower end while it is still being lowered at its upper end.

SUMMARY OF THE INVENTION

Accordingly it is a purpose of the present invention to remedy this drawback and to provide a method and apparatus for stabbing a flowline into a guide tube and subsequently hinging over the flowline in a predetermined direction without the risk of buckling of the flowline.

The method according to the invention comprises the steps of: (a) erecting a guide tube adjacent the waterbottom, said guide tube comprising a central opening defined downwardly therethrough, a pair of parallel slots formed within said central opening at opposite side thereof, and passage means for allowing the flowline to hinge over about a horizontal pivot axis passing transversally through said slots; (b) stabbing a lower end of the flowline downwardly into the guide tube, and maneuvering pivots which are mounted at opposite sides of the flowline near the lower end thereof in slidable engagement with the slots; (c) deflecting the flowline near the lower end thereof in a predetermined lateral direction, thereby inducing at least a lower portion of the flowline to hinge over to an inclined position in response to lowering of the pivots into the slots; and (d) landing the pivots on a pair of pivot supports mounted at the lower ends of the slots, allowing the lower portion of the flowline to further hinge over to a substantially horizontal position and laying the flowline away from the guide tube.

The apparatus according to the invention comprises: (a) a guide tube which is suitable to be mounted in a vertical orientation near the waterbottom, said guide tube having a central opening defined downwardly therethrough, a pair of parallel slots formed within the central opening at the opposite side thereof; (b) the guide tube further comprising passage means for allowing the flowline to hinge over about a horizontal pivot axis passing transversally through the slots; (c) a pair of pivots mounted at opposite sides of the flowline near a lower end thereof, said pivots fitting in the slots in a slidable manner when the lower end of the flowline is stabbed into the guide tube; (d) guide means for maneuvering the pivots into slidable engagement with the slots; (e) deflector means for inducing at least a lower portion of the flowline to hinge over to an inclined position in response to lowering of the pivots into the slots; and (f) a pair of pivot supports mounted at the lower ends of the slots for supporting the pivots while hinging the flowline over to a horizontal position and laying the flowline away from the guide tube.

A principal advantage offered by the present invention is that the deflection of a lower portion of the flowline while the pivots are slidably located within the slots and before the pivots have reached the pivot supports at the lower ends of these slots induces the flowline to obtain a S or bow shape during its further descent thereby avoiding that the flowline has a straight orientation when the pivots land onto the pivot supports. A further advantage is that the deflection of the lower end of the flowline causes a gradual deceleration of said flowline end before the pivots land onto the pivot supports. Another advantage is that the direction of the flowline end deflection is controlled by the present invention.

In a first preferred embodiment of the apparatus according to the invention the flowline comprises at the lower end thereof a conical nose section and the guide tube is provided with deflector means comprising a deflector element which is mounted in an eccentric position within the central opening of the guide tube below the pivot supports.

In a second preferred embodiment of the apparatus according to the invention the flowline comprises at a location above said pivots deflector means provided by a cam which deflects the flowline into a tilted position when it slidably engages the upper end of the guide tube during the step of stabbing the flowline into the guide tube.

BRIEF DESCRIPTION OF THE DRAWINGS

Having thus generally described the method and apparatus of the present invention, the following is a more detailed description thereof given in accordance with specific reference to the accompanying drawings in which:

FIGS. 1, 2 and 3 show by sequential stages a flowline stab in hinge over procedure wherein a first preferred embodiment of the apparatus according to the invention is used.

FIGS. 4, 5 and 6 show by sequential stages a flowline stab in and hinge over procedure wherein a second preferred embodiment of the apparatus according to the invention is used.

DESCRIPTION OF PREFERRED EMBODIMENTS

Referring now to FIGS. 1, 2 and 3 there is shown the lower end portion of a flowline 1 which is laid from a floating pipelay vessel (not shown).

A guide tube 2 provided at the upper end thereof with a guide funnel 3 is mounted in a substantially vertical orientation near the waterbottom (not shown). Along the inner wall of the guide tube 2 there is arranged a pair of helical shoulders 4 (one of which is shown in the perspective cut away view of FIGS. 1, 2 and 3) which have a similar but opposite pitch and lead into a vertical guide channel 5. The flowline 1 is near the lower end thereof provided with a conical nose section 7 on which a guide key 8 is mounted.

The guide key 8, helical shoulders 4 and the guide channel 5 form guide means for guiding the flowline 1 in a predetermined angular orientation into the guide tube 2. If the guide key 8 lands onto one of the helical shoulders 4 further lowering of the flowline will induce the guide key 8 to slide along this shoulder 4 thereby rotating the nose section 7 and twisting the upper parts of the flowline until the guide key 8 has reached the guide channel 5.

When the guide key 8 reaches the upper entry of the guide channel 5 the lower end of the flowline 1 is oriented such that a pair of pivots 10 which are mounted at opposite sides of the flowline on a support collar 11 are located just above the upper entries 12 of a pair of vertical slots 13, so that upon further lowering of the flowline the pivots 10 will slide into the slots 13.

The upper slot entries 12 are too shallow to allow entry of the guide key 8 into the slots 13 during their descent along the shoulders 4. Axial guide ribs 14 are provided for centering the flowline in the guide tube 2. The guide tube 2 is further provided with a deflector rod 15 which is arranged in a horizontal orientation in the guide tube 2, close to the guide channel 5, in order to push the lower end of the flowline 1 away from the guide channel 5, as indicated by arrow I, when the conical nose section 7 slidably engaged the rod 15.

When the nose section 7 slides along the deflector rod 15, the pivots 10 are already located within the slots 13, so that the flowline 1 will upon further lowering thereof, hinge over about a horizontal pivot axis defined by the pivots 10, and the portion of the flowline 1 directly above the pivots 10 will hinge over in the direction indicated by arrow II. The hinging motion of the lower end of the flowline about the pivots 10 induces the flowline 1 to obtain a S or bow shape in a predetermined direction during its further descent thereby avoiding that the flowline 1 has a straight orientation when the pivots 10 land on pivot supports 16 at the lower ends of the slots 13. Thus the deflector rod 15 ensures a smooth deceleration of the lower end of the flowline 1 before the pivots 10 land onto the pivot supports and simultaneously avoids any chance of buckling of the flowline due to a sudden stop of the lower end thereof while the upper part is still being lowered from the pipelay vessel (not shown).

As can be seen in FIG. 3 the flowline 1 is hinged over to a substantially horizontal position by further lowering the flowline from the pipelay vessel while moving the pipeline vessel away from a location above the guide tube 2. During the hinge over procedure the flowline hinges about a horizontal pivot axis defined by the pivots 10 while the portion of the flowline 1 beneath the pivots 10 swings through the wall of the tube 2 via a first elongate passage 17 at one side of the tube 2 and the portion of the flowline above the pivots 10 swings through the wall of the tube 2 and funnel 3 via a second passage 18 which is located at an opposite side of the tube 2, diametrically relative to said first passage 17.

FIGS. 4, 5 and 6 show by sequential stages a stab in and hinge over procedure wherein a second preferred embodiment of the apparatus according to the invention is used. In these Figures there is shown the lower end of a flowline 21 which is laid from a floating pipelay vessel (not shown).

A guide tube 22 is mounted in a substantially vertical orientation at the waterbottom 23. Along the inner wall of the guide tube 22 there is arranged a pair of helical shoulders 24 (one of which is shown in the vertical sectional view of the guide tube 22 in FIGS. 4–6) which have a similar but opposite pitch and lead into a vertical guide channel 25.

The flowline 21 is near the lower end thereof provided with a conical nose section 27 on which a guide key 28 is mounted. The guide key 28, helical shoulders 24 and the guide channel 25 form guide means for guiding the flowline 21 in a predetermined angular orientation into the guide tube 22. If the key 8 lands onto one of the helical shoulders 24 further lowering of the flowline will induce the guide key to slide along this shoulder 24, thereby rotating the nose section 27 and twisting the upper parts of the flowline until the guide key 28 has reached the upper entry of the guide channel 25.

When the guide key 28 reaches the upper entry of the guide channel 25 a pair of pivots 30, which are mounted at opposite sides of the flowline on a support collar 31, are located just above the upper entries 32 of a pair of vertical slots 33, so that upon further lowering of the flowline the pivots 30 will slide into the slots 33.

The flowline 20 is at a location above the collar 31 provided with a cam 35 which, as can be seen in FIG. 5, deflects the portion of the flowline 1 above the pivots 30 in a lateral direction as indicated by arrow V when it slidably engages the upper rim 36 of the shoulders 24. When the cam 35 slides along said rim 36 the pivots 30 are already located within the slots 33 and the lower portion of the flowline 20 will upon further lowering thereof into the guide tube 22 be induced by the cam 35 to gradually hinge over about a horizontal pivot axis defined by the pivots 30.

The hinging motion of the lower portion of the flowline 21 will induce the flowline 21, which is still deployed from a pipelay vessel located vertically above the guide tube 22, to obtain a S or bow shape in a predetermined direction during its further descent thereby avoiding that the flowline 1 has a straight orientation when the pivots 30 land on pivot supports 40 at the lower ends of the slots 33 and simultaneously avoids any chance of buckling of the flowline due to a sudden stop of the lower end thereof while the upper part thereof is still being lowered from the pipelay vessel.

After landing of the pivots 30 onto the pivot supports 40 the flowline 21 is hinged over to the substantially horizontal position shown in FIG. 6 by further lowering the flowline from the pipelay vessel while moving the vessel away from a location above the guide tube. During the hinge over procedure the flowline 21 hinges about a horizontal pivot axis defined by the pivots 30 while the portion of the flowline 21 beneath the pivots 30 swings through the wall of the tube 22 via a first elongate passage 37 at one side of the tube 22 and the portion of the flowline 21 above the pivots 30 swings through the wall of the tube 22 and guide funnel 38 via a second passage 39 which is located at an opposite side of the tube 22, diametrically relative to said first passage 37.

It is observed that the flowline may be a single or multibore steel or composite pipe or may comprise a bundle of braided hydraulic and electrical conduits which are at the lower ends thereof encapsulated in a protective tube on which the nose section, guide key and pivots are mounted.

If the flowline is laid in deep water then it is generally desirable to steer the lower end thereof into the guide funnel by means of a Remotely Operated Vehicle (ROV).

Such a ROV could be used to orient the lower end of the flowline in a preset angular orientation when it is stabbed into the guide tube. In that case the presence of the helical shoulders within the guide tube could be omitted.

Furthermore, instead of mounting the guide tube on the waterbottom it may also be mounted on a subsea structure such as an Underwater Manifold Center (UMC). Such a UMC may be provided with a plurality of guide tubes for securing a plurality of underwater flowlines thereto, which flowlines lead to underwater wellheads of oil and/or gas wells.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A method for lowering a flowline through a body of water and subsequently hinging over the flowline to a substantially horizontal position near the waterbottom, the method comprising:
    erecting a guide tube adjacent the waterbottom, said guide tube comprising a central opening defined downwardly therethrough, a pair of parallel slots formed within said central opening at the opposite side thereof, and passage means for allowing the flowline to hinge over about a horizontal pivot axis passing transversally through said slots;
    stabbing a lower end of said flowline downwardly into the guide tube, and maneuvering pivots which are mounted at opposite sides of the flowline near the lower end thereof in slidable engagement with said slots;
    deflecting the flowline near the lower end thereof in a predetermined lateral direction thereby inducing at least a lower portion of said flowline to hinge over to an inclined position in response to lowering of said pivots into said slots; and
    landing said pivots on a pair of pivot supports mounted at the lower ends of said slots, allowing said lower portion of the flowline to further hinge over to a substantially horizontal position and laying the flowline away from the guide tube.

2. The method of claim 1, wherein the flowline is lowered through the body of water by deploying the flowline from a floating pipelay vessel.

3. An apparatus for lowering a flowline through a body of water and subsequently hinging over the flowline to a substantially horizontal position near the waterbottom, the apparatus comprising:
    a guide tube which is suitable to be mounted in a vertical orientation near the waterbottom, said guide tube having a central opening defined downwardly therethrough, a pair of parallel slots formed within said central opening at the opposite side thereof;
    means for stabbing a lower end of said flowline downwardly into the guide tube;
    the guide tube further comprising passage means for allowing the flowline to hinge over about a horizontal pivot axis passing transversally through said slots;
    a pair of pivots mounted at opposite sides of the flowline near a lower end thereof, said pivots fitting in said slots in a slidable manner when said lower end of the flowline is stabbed into the guide tube;
    guide means for maneuvering the pivots into slidable engagement with the slots;
    deflector means for inducing at least a lower portion of the flowline to hinge over to an inclined position in response to lowering of said pivots into said slots; and
    a pair of pivot supports mounted at the lower ends of said slots for supporting the pivots while hinging the flowline over to a horizontal position and laying the flowline away from the guide tube.

4. The apparatus of claim 3, wherein the flowline comprises at the lower end thereof a conical nose section and the guide tube is provided with deflector means comprising a deflector element which is mounted in an eccentric position within the central opening of the guide tube below the pivot supports.

5. The apparatus of claim 4, wherein the deflector element comprises a rod which is oriented parallel to said pivot axis.

6. The apparatus of claim 3, wherein the flowline comprises at a location above said pivots deflector means provided by a cam which deflects the flowline into a tilted position when it slidably engages the upper end of the guide tube during the step of stabbing the flowline into the guide tube.

7. The apparatus of claim 3, wherein the flowline is at the lower end thereof provided with a guide key which is adapted to slidably engage guide means provided by one of a pair of helical shoulders which are oriented in opposite directions along the inner wall of the guide tube, and which form at the lower ends thereof a substantially vertically oriented guide channel along the inner wall of the tube so as to orient the flowline in a predetermined position in the guide tube when the key slides through said channel, in which position the pivots are aligned with said slots.

8. The apparatus of claim 7, wherein said slots have an upper entry in each one of said helical shoulders, each of said entries having a depth which is sufficiently small to prevent said guide key from entering into said slots when it slides in use along one of said shoulders.

9. The apparatus of claim 3, wherein the flowline comprises a bundle of hydraulic and electric conduits.

* * * * *